US012672127B2

(12) United States Patent
Panzner et al.

(10) Patent No.: US 12,672,127 B2
(45) Date of Patent: Jun. 30, 2026

(54) REUSING SIDELINK RESOURCES ASSOCIATED WITH DROPPED CONFIGURED GRANT

(71) Applicant: Nokia Technologies Oy, Espoo (FI)

(72) Inventors: Berthold Panzner, Holzkirchen (DE); Vinh Van Phan, Oulu (FI); Ling Yu, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 787 days.

(21) Appl. No.: 18/162,896

(22) Filed: Feb. 1, 2023

(65) Prior Publication Data

US 2023/0262685 A1 Aug. 17, 2023

Related U.S. Application Data

(60) Provisional application No. 63/309,041, filed on Feb. 11, 2022.

(51) Int. Cl.
*H04W 72/1263* (2023.01)

(52) U.S. Cl.
CPC .............................. *H04W 72/1263* (2013.01)

(58) Field of Classification Search
None
See application file for complete search history.

(56) References Cited

U.S. PATENT DOCUMENTS

2019/0059076 A1* 2/2019 Puschmann ........... H04W 72/04
2022/0046600 A1* 2/2022 Hosseini ............... H04W 72/25

2022/0110095 A1* 4/2022 Zhao ................. H04W 72/0446
2022/0329389 A1* 10/2022 Park ...................... H04L 1/1893
2023/0056574 A1* 2/2023 Hwang ................. H04W 72/25
2023/0276474 A1* 8/2023 Mohammad .......... H04W 72/02
370/329
2023/0397216 A1* 12/2023 Kang ................. H04W 72/1268
2024/0284480 A1* 8/2024 Nguyen ............... H04W 28/26

OTHER PUBLICATIONS

"WID revision: NR sidelink enhancement", 3GPP TSG RAN Meeting #90e, RP-202846, Agenda: 9.8.3, LG Electronics, Dec. 7-11, 2020, 6 pages.
"Summary of [POST116-e][716][SL] MAC open issues", 3GPP TSG-RAN WG2 Meeting #116bis electronic, R2-2200051, Agenda: 8.15.2, LG Electronics Inc, Jan. 17-25, 2022, 48 pages.
Bonjorn et al., "Enhanced 5G V2X Services using Sidelink Device-to-Device Communications", 17th Annual Mediterranean Ad Hoc Networking Workshop (Med-Hoc-Net), Jun. 20-22, 2018, 7 pages.

* cited by examiner

*Primary Examiner* — Jenkey Van
(74) *Attorney, Agent, or Firm* — Nokia Technologies Oy

(57) ABSTRACT

Systems, methods, apparatuses, and computer program products for reusing sidelink resources associated with dropped configured grant are provided. For example, a method can include receiving, with a first device, a sidelink grant from a network node for transmission to a third device; receiving a coordination request from a second device; determining whether to transmit to the third device using at least one resource associated with the sidelink grant; and determining whether to forward the at least one resource associated with the sidelink grant to the second device with a response to the coordination request.

18 Claims, 13 Drawing Sheets coverage area
(SL mode 1 RA)

out-of-coverage
area (SL mode 2 RA)

mode 1 TX mode 2 RX mode 2 TX

210

RRC or DCI (providing sidelink grant)

mode 1 RX

206

IUC request

IUC response
208 mode 2 TX

UE-A
110-1

UE-B
110-2 gNB
170

204

202

UE-C
110-3

SL mode 1 resources   SL mode 2 resources
(SL configured grant)  (proposed in IUC response)

500

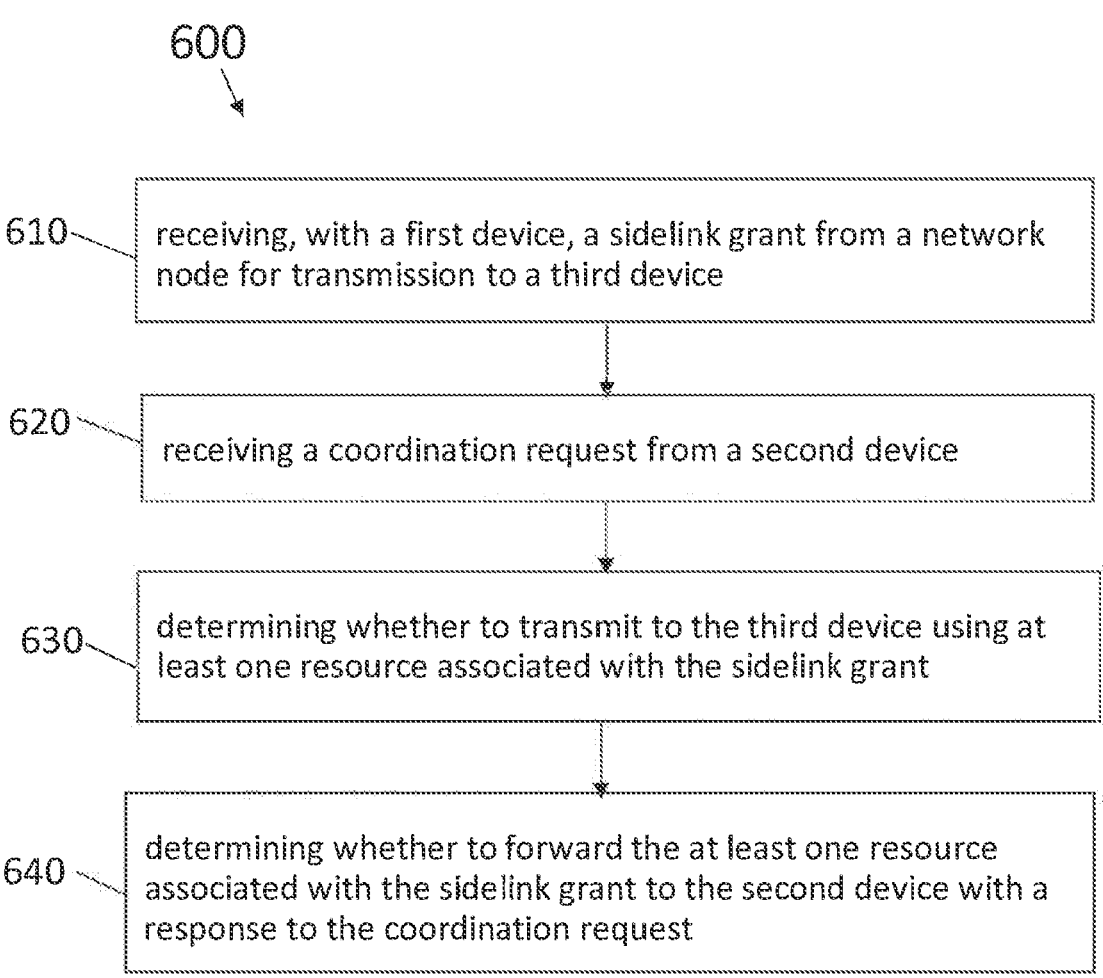

600

610 — receiving, with a first device, a sidelink grant from a network node for transmission to a third device 620 — receiving a coordination request from a second device 630 — determining whether to transmit to the third device using at least one resource associated with the sidelink grant 640 — determining whether to forward the at least one resource associated with the sidelink grant to the second device with a response to the coordination request

FIG. 9

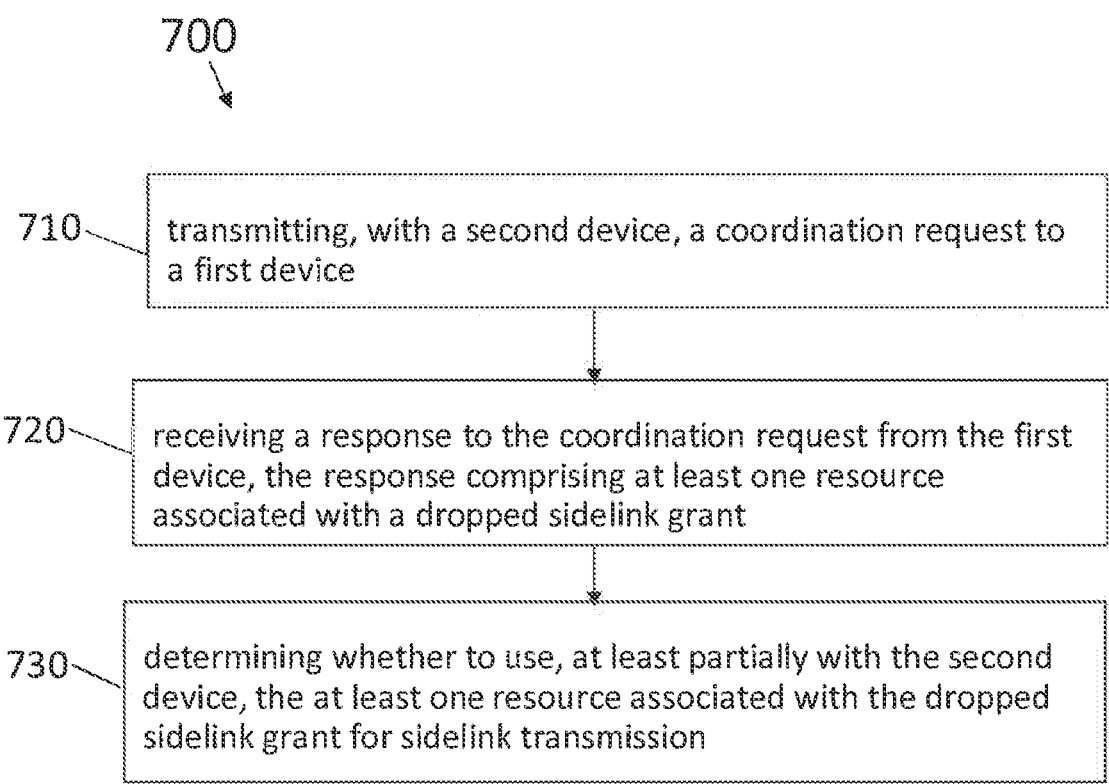

700

710 — transmitting, with a second device, a coordination request to a first device 720 — receiving a response to the coordination request from the first device, the response comprising at least one resource associated with a dropped sidelink grant 730 — determining whether to use, at least partially with the second device, the at least one resource associated with the dropped sidelink grant for sidelink transmission

810 — transmitting a sidelink grant from a network node to a first device

820 — wherein the sidelink grant is configured to be used with the first device for transmission to a third device 830 — transmitting an indication to the first device that at least one resource associated with the sidelink grant can be forwarded to a second device

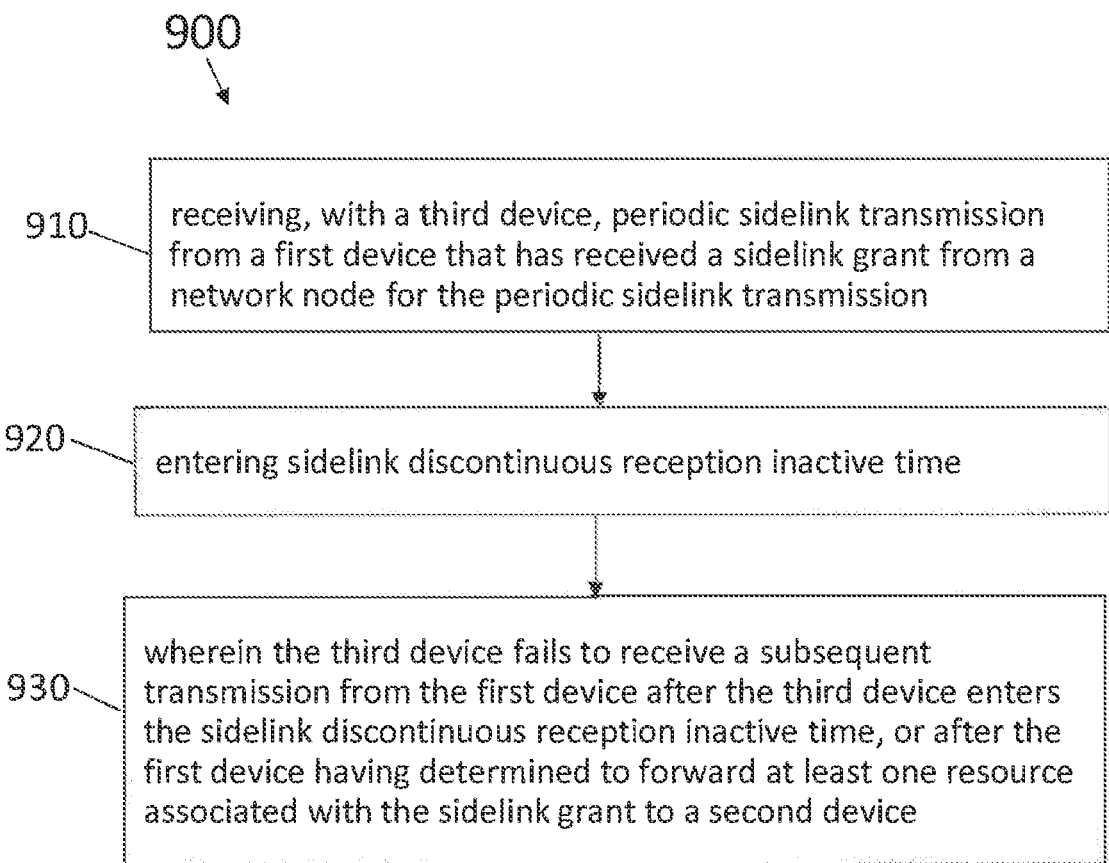

900

910 — receiving, with a third device, periodic sidelink transmission from a first device that has received a sidelink grant from a network node for the periodic sidelink transmission 920 — entering sidelink discontinuous reception inactive time 930 — wherein the third device fails to receive a subsequent transmission from the first device after the third device enters the sidelink discontinuous reception inactive time, or after the first device having determined to forward at least one resource associated with the sidelink grant to a second device

FIG. 12

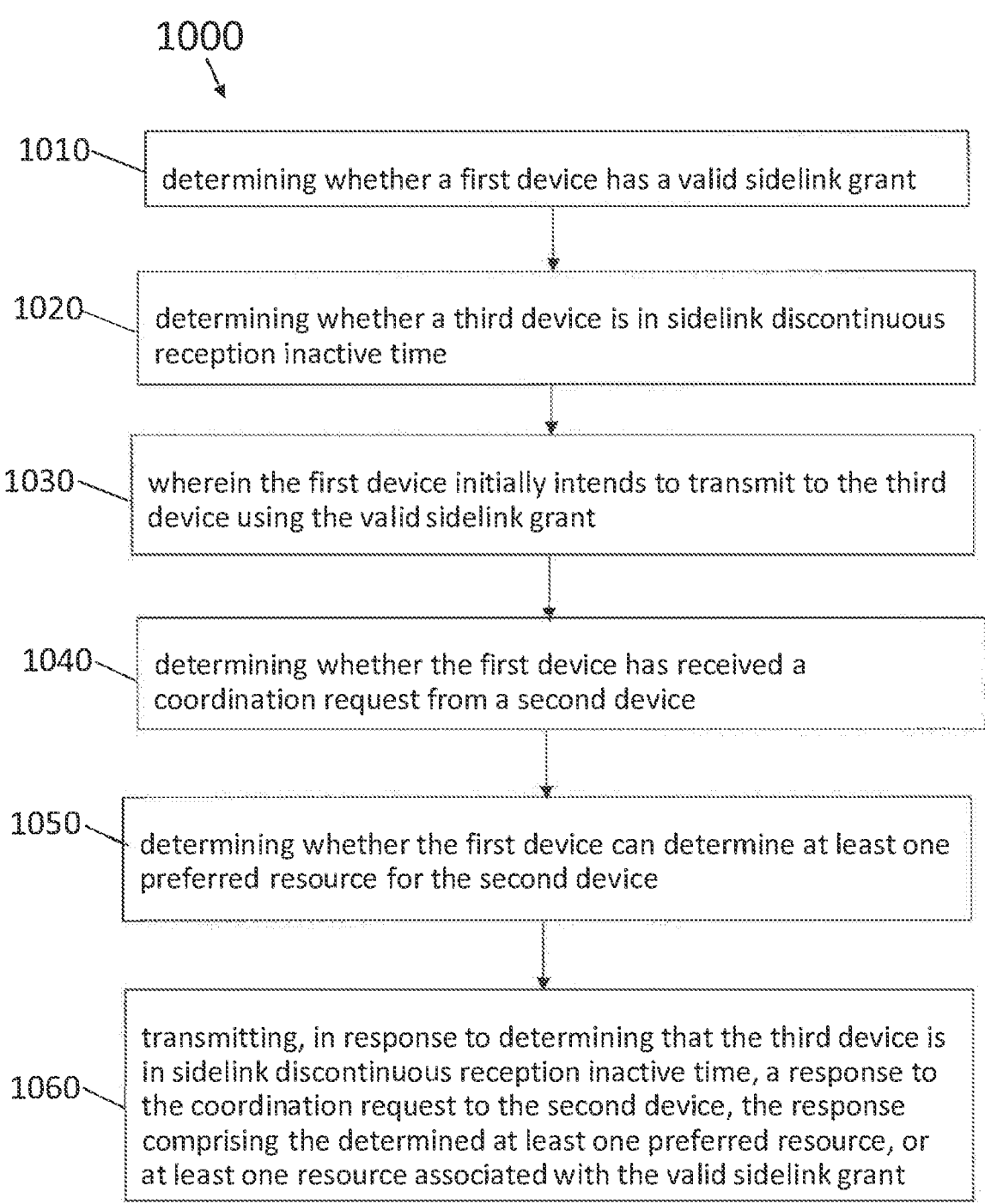

1000

1010 — determining whether a first device has a valid sidelink grant

1020 — determining whether a third device is in sidelink discontinuous reception inactive time 1030 — wherein the first device initially intends to transmit to the third device using the valid sidelink grant 1040 — determining whether the first device has received a coordination request from a second device 1050 — determining whether the first device can determine at least one preferred resource for the second device 1060 — transmitting, in response to determining that the third device is in sidelink discontinuous reception inactive time, a response to the coordination request to the second device, the response comprising the determined at least one preferred resource, or at least one resource associated with the valid sidelink grant

FIG. 13

REUSING SIDELINK RESOURCES ASSOCIATED WITH DROPPED CONFIGURED GRANT

CROSS-REFERENCE TO RELATED APPLICATION

This application is related to and claims the priority of U.S. Provisional Patent Application No. 63/309,041, filed Feb. 11, 2022, the entirety of which is hereby incorporated herein by reference.

TECHNICAL FIELD

The examples and non-limiting embodiments relate generally to communications and, more particularly, to reusing sidelink resources associated with dropped configured grant.

BACKGROUND

It is known to facilitate communications between mobile devices in a communication network.

SUMMARY

An embodiment may be directed to an apparatus. The apparatus can include at least one processor; and at least one memory storing instructions that, when executed by the at least one processor, cause the apparatus at least to perform: receiving, with a first device, a sidelink grant from a network node for transmission to a third device; receiving a coordination request from a second device; determining whether to transmit to the third device using at least one resource associated with the sidelink grant; and determining whether to forward the at least one resource associated with the sidelink grant to the second device with a response to the coordination request.

An embodiment may be directed to an apparatus. The apparatus can include at least one processor; and at least one memory storing instructions that, when executed by the at least one processor, cause the apparatus at least to perform: transmitting, with a second device, a coordination request to a first device; and receiving a response to the coordination request from the first device, the response comprising at least one resource associated with a dropped sidelink grant; and determining whether to use, at least partially with the second device, the at least one resource associated with the dropped sidelink grant for sidelink transmission.

An embodiment may be directed to a method. The method can include receiving, with a first device, a sidelink grant from a network node for transmission to a third device; receiving a coordination request from a second device; determining whether to transmit to the third device using at least one resource associated with the sidelink grant; and determining whether to forward the at least one resource associated with the sidelink grant to the second device with a response to the coordination request.

An embodiment may be directed to a method. The method can include transmitting, with a second device, a coordination request to a first device; and receiving a response to the coordination request from the first device, the response comprising at least one resource associated with a dropped sidelink grant; and determining whether to use, at least partially with the second device, the at least one resource associated with the dropped sidelink grant for sidelink transmission.

BRIEF DESCRIPTION OF THE DRAWINGS

The foregoing aspects and other features are explained in the following description, taken in connection with the accompanying drawings.

FIG. 9 is an example method performed with a user equipment to implement the examples described herein.

FIG. 10 is an example method performed with a user equipment to implement the examples described herein.

FIG. 12 is an example method performed with a user equipment to implement the examples described herein.

FIG. 13 is an example method performed with a user equipment to implement the examples described herein.

DETAILED DESCRIPTION OF EXAMPLE EMBODIMENTS

Figure 1:
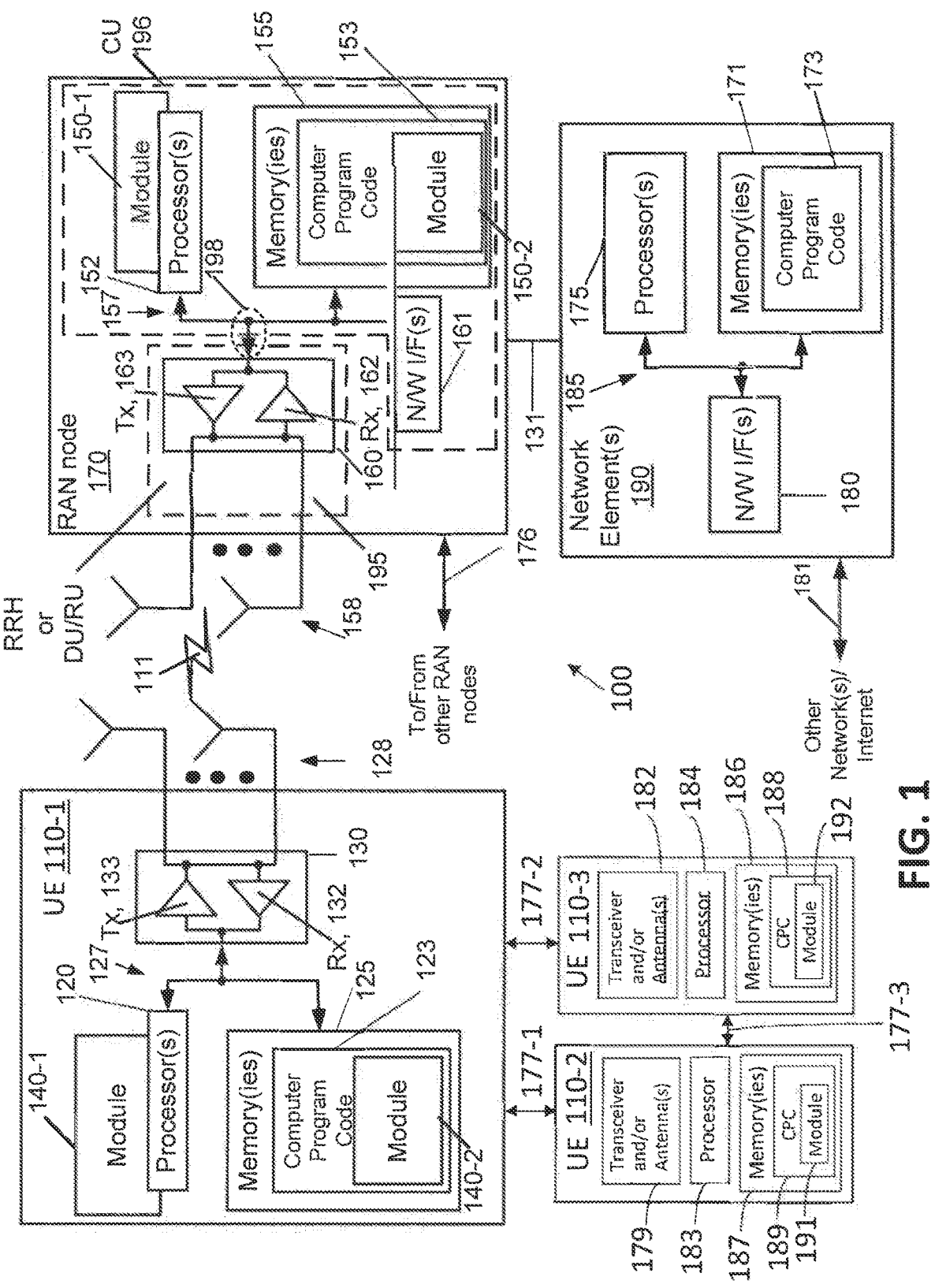
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110-1, radio access network (RAN) node 170, and network element(s) 190 are illustrated. In the example of FIG. 1, the user equipment (UE) 110-1 is in wireless communication with a wireless network 100. A UE is a wireless device that can access the wireless network 100. The UE 110-1 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110-1 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120.

For instance, the one or more memories 125 and the computer program code 123 may be configured to, with the one or more processors 120, cause the user equipment 110-1 to perform one or more of the operations as described herein. The UE 110-1 communicates with PAN node 170 via a wireless link 111.

FIG. 1 further shows that at least two UEs can communicate over NR Sidelink/PC5. UE 110-1 communicates with UE 110-2 over NR sidelink PC5 interface 177-1. UE 110-1 communicates with UE 110-3 over NR sidelink PC5 interface 177-2. UE 110-2 comprises circuitry including transceiver and/or antenna(s) 179, processor 183, and memory(ies) 187 that includes computer program code 189 having module 191. UE 110-3 comprises circuitry including transceiver and/or antenna(s) 182, processor 184, and memory(ies) 186 that includes computer program code 188 having module 192. Other circuitry, including the circuitry shown within UE 110-1, may be included within UE 110-2 and UE 110-3. UE 110-2 may also communicate with UE 110-3 over NR sidelink PC5 interface 177-3. UE 110-2 may also communicate with radio node 170 using transceiver and/or antenna(s) 179 within the network 100. UE 110-3 may also communicate with radio node 170 using transceiver and/or antenna(s) 182 within the network 100.

The RAN node 170 in this example is a base station that provides access by wireless devices such as the UE 110-1 to the wireless network 100. The PAN node 170 may be, for example, a base station for 5G, also called New Radio (NR). In 5G, the PAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the PAN node 170 and centralized elements of the PAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under PAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The PAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The PAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the PAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the PAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMFF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The PAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110-1, PAN node 170, network element(s) 190, and other functions as described herein.

In general, the various embodiments of the user equipment 110-1 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110-1, RAN node 170, and/or network element(s) 190, (and associated memories, computer program code and modules) may be configured to implement (e.g. in part) the methods described herein, including reusing sidelink resources associated with a dropped configured grant. The configured grant may be a dynamic, periodic or semi-persistent grant. Thus, computer program code 123, module 140-1, module 140-2, and other elements/features shown in FIG. 1 of UE 110-1 may implement user equipment related aspects of the methods described herein. UE 110-2 and UE 110-3 and their associated circuitry may also implement user equipment related aspects of the methods described herein. Similarly, computer program code 153, module 150-1, module 150-2, and other elements/features shown in FIG. 1 of PAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

The examples described herein are related to NR sidelink mode 1 resource assignment and signaling (of the allocated sidelink resources) by the network/gNB in particular an NR sidelink configured grant. The examples described herein are further related to enhanced resource allocation in NR sidelink mode 2.

Mode 1 refers to the sidelink resource allocation mode in which the serving gNB schedules or allocates resources to the UE for sidelink transmissions. Mode 2 refers to the sidelink resource allocation mode in which the UE autonomously selects resources from one or more configured resource pools for sidelink transmissions.

Figure 2:
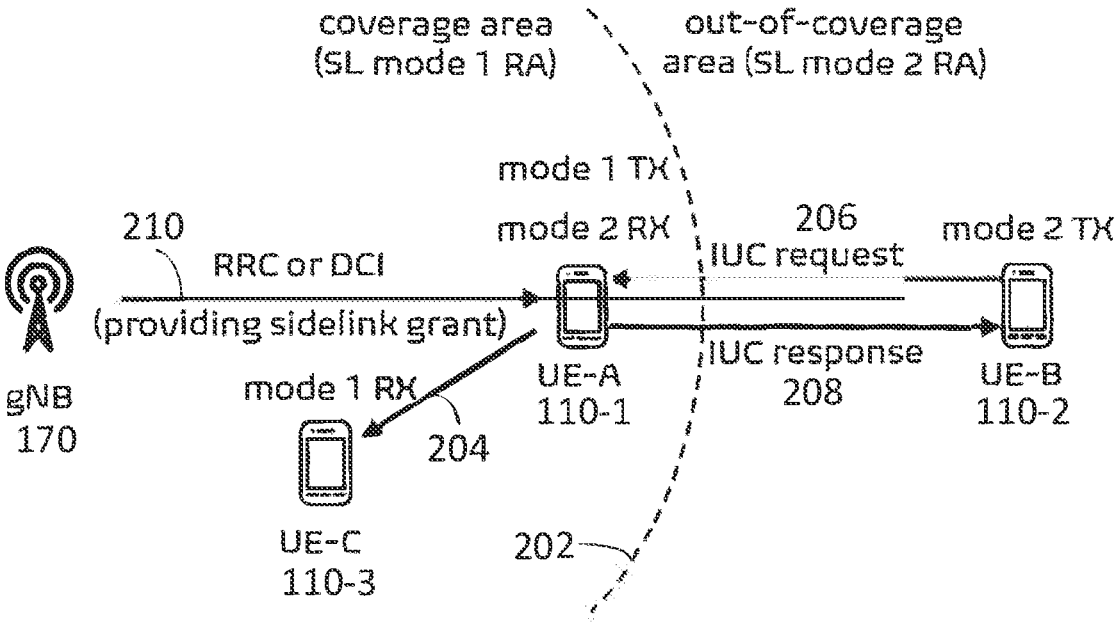
FIG. 2 depicts a scenario where a sidelink UE in coverage of a serving cell is communicating with two different UEs over a NR sidelink using a PC5 interface.

Consider the scenario shown in FIG. 2: UE-A 110-1 is a sidelink UE (in coverage of a serving cell 202) that is communicating with two different UEs (110-2, 110-3) over NR sidelink (using e.g., a PC5 interface).

On one hand UE-A 110-1 is a TX-UE for sidelink communication in NR sidelink mode 1 with UE-C 110-3 (being the receiver of UE-A's transmission 204) and on the other hand UE-A 110-1 is requested by UE-B 110-2 (possibly being out of coverage of the serving cell 202) to propose a set of preferred mode 2 sidelink resources for UE-B 110-2.

In that sense UE-A 110-1 can be considered to be in a hybrid/mixed scenario: UE-A 110-1 is a mode 1 TX UE and at the same time a mode 2 RX UE (for the IUC request 206).

The problem that arises for this scenario is induced with the following two conditions (A-B immediately following):

A. UE-A 110-1 (TX-UE for mode 1) may need to drop a NR SL mode 1 configured grant 210 (scheduled by gNB 170 and originally intended for transmission from UE-A 110-1 to UE-C 110-3) because, for example, i) the receiver UE-C 110-3 (in mode 1) may be configured with SL-DRX not matching the transmission time of the UE-A's CG 210 (e.g. UE-C 110-3 might be inactive); ii) UE-A 110-1 has other higher priority traffic to transmit e.g. UL transmission and cannot make simultaneously SL and UL transmission due to the capability limitation; iii) SL is operated in an unlicensed band and LBT is failed by UE-A 110-1 to acquire the unlicensed channel for its SL transmission.

B. UE-A 110-1 (RX-UE for mode 2 IUC request 206) not being able to propose a set of preferred sidelink (mode 2) resources for UE-B 110-2 that match the requirements indicated in UE-B's IUC request 206. The reasons why UE-A 110-1 is not able to propose a set of preferred resources are, for example: UE-A 110-1 does not find a) any, b) enough, c) suitable (for UE-B 110-2) sidelink mode 2 resources to propose to UE-B 110-2, where such proposal may occur within IUC response 208.

Figure 3:
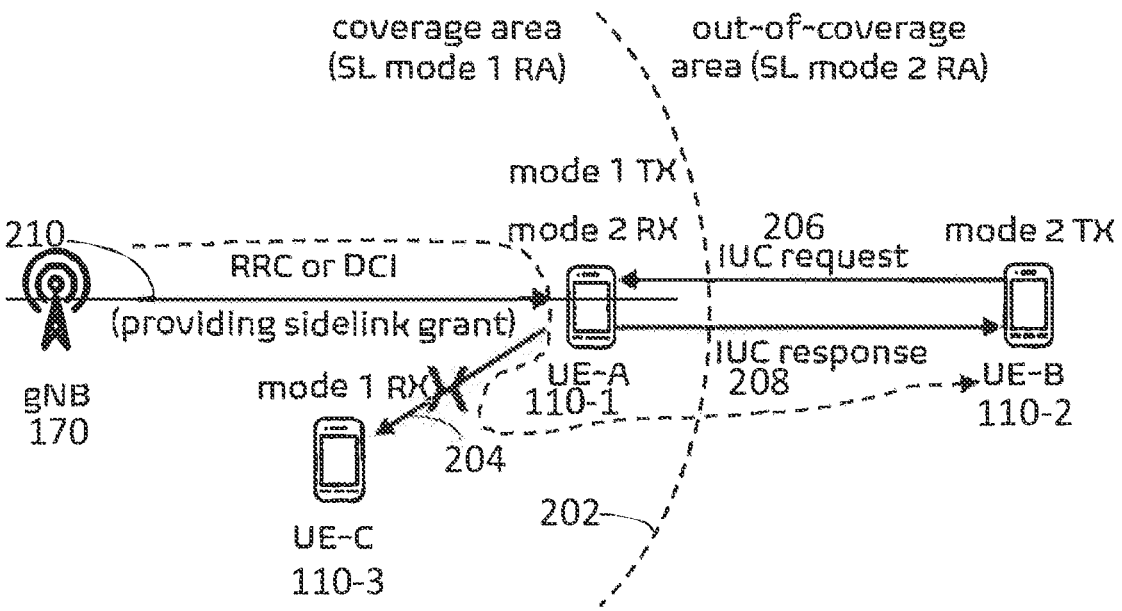
FIG. 3 illustrates reuse of a dropped mode 1 CG for an NR SL mode 2 IUC response.

With reference to FIG. 3, the examples described herein relate to an apparatus and method to facilitate from a first device (UE-A 110-1) the transfer/proposition of sidelink resources associated with a NR SL mode 1 CG 210 to a second device (UE-B 110-2) for use in NR SL mode 2 communication of the second UE (UE-B 110-2) in case the first device (UE-A 110-1) needs to drop the NR SL mode 1 CG for the originally intended transmission 204 to a third device (UE-C 110-3). As shown in FIG. 3, UE-A 110-1 and UE-C 110-3 may be within the coverage area of the network node 170, and UE-B 110-2 may be outside the coverage area of the network node 170. UE-A 110-1 may be configured in mode 1 transmission and mode 2 reception, UE-C 110-3 may be configured in mode 1 reception and may be configured in sidelink discontinuous reception, and UE-B 110-2 may be configured in mode 2 transmission.

Figure 4:
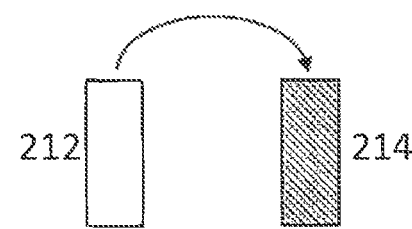
FIG. 4 is a diagram illustrating that sidelink resources associated with SL mode 1 CG are partially or fully reused as mode 2 resources.

With reference to FIG. 3 and FIG. 4, when the first device (UE-A 110-1) cannot make use of, or needs to drop, the assigned NR SL CG 210 the sidelink resources 212 associated with that SL CG 210 may be recommended as at least a part of a set of preferred mode 2 resources 214 for the second device (UE-B 110-2), where the second device (UE-B 110-2) has requested (in an IUC request message 206) the first device (UE-A 110-1) to propose a set of preferred sidelink mode 2 resources.

The second device (UE-B 110-2) is able to (re)use (either partially or fully) sidelink resources 212 associated with the SL CG 210 of the first device (UE-A 110-1) and originally intended for a transmission to a third device (UE-C 110-3) (transmission from UE-A 110-1 to UE-C 110-3 did not happen) for another transmission of the second device (UE-B 110-2) in NR SL mode 2.

According to the current 3GPP specification the first device (UE-A 110-1) would drop its SL CG 210 i.e. not using it for any transmission other than an original intent which results in bad sidelink resource utilization. The technical effect of the examples described herein is that although the first device (UE-A 110-1) drops its SL CG 210 (for intended transmission to a third device 110-3) the sidelink resources 212 are not wasted since the sidelink resources 212 are indicated to a second device 110-2 in need of sidelink resources (and the second device being in NR SL mode 2) as "available/free" sidelink resources 214.

Instead of wasting the "abandoned" mode 1 sidelink resources 212 the reserved resources are "converted" (proposed to (re)use) as available/free sidelink mode 2 resources 214 upon a prior IUC request 206. The resources 212 associated with the dropped grant may be interference-free. The mode 1 grant 210 is dropped for UE-C 110-3 but the resources are not wasted and reused 214 for UE-B's transmission.

The proposed method includes the following signaling procedures between the gNB 170 and UE-A 110-1 as well as between UE-A 110-1 and UE-B 110-2 (1-3 immediately following):

1. gNB 170 may indicate whether sidelink resources 212 associated with SL CG 210 scheduled by gNB 170 can be reused/forwarded to the second device (e.g. UE-B 110-2). The indication may be general to all SL mode 1 grants using the indication bits in a broadcasted SIB. Alternatively, the indication can be also dedicated to the first device (UE-A 110-1) using dedicated RRC signaling. In either case, the conditions of forwarding SL CG 210 to another SL UE may be specified together with the indication. For instance, the range of Uu RSRP of UE-A 110-1, the range of SL RSRP between UE-A 110-1 and UE-B 110-2, the CBR range of the SL mode 2 resource pool, the QoS of SL traffic of UE-A 110-1 and/or UE-B 110-2 etc.

2. When the first device (UE-A 110-1) dropped the SL CG 210 and forwarded it to the second SL UE (UE-B 110-2) according to the network/gNB configured indication and/or conditions for SL CG forwarding, UE-A 110-1 may be configured to report this to its serving gNB 170. In this report, the information of the second device (UE-B 110-2) may be included such as UE-B's ID, SL RSRP between UE-A 110-1 and UE-B 110-2, UE-B's location etc. This report may trigger gNB 170 to reschedule the SL mode 1 resources 212 to relevant UEs (not only to UE-A 110-1, but also to other SL UEs that may be in proximity of UE-B 110-2). In another example, the report may trigger gNB 170 to request UE-A 110-1 to abandon the SL CG forwarding.

3. Forwarding of resources 212 associated with SL CG 210 is signaled from the first device (UE-A 110-1) to the second device (UE-B 110-2) in the IUC response message 208 that is enhanced with an indication/IE (indicating that the proposed set of preferred sidelink mode 2 resources 214 originated from a dropped SL mode 1 CG 210). The second device (UE-B 110-2) may then use at least a fraction of the resources 212 associated with the SL mode 1 CG 210 for its own sidelink transmission in mode 2 without a need of revalidation.

Figure 5:
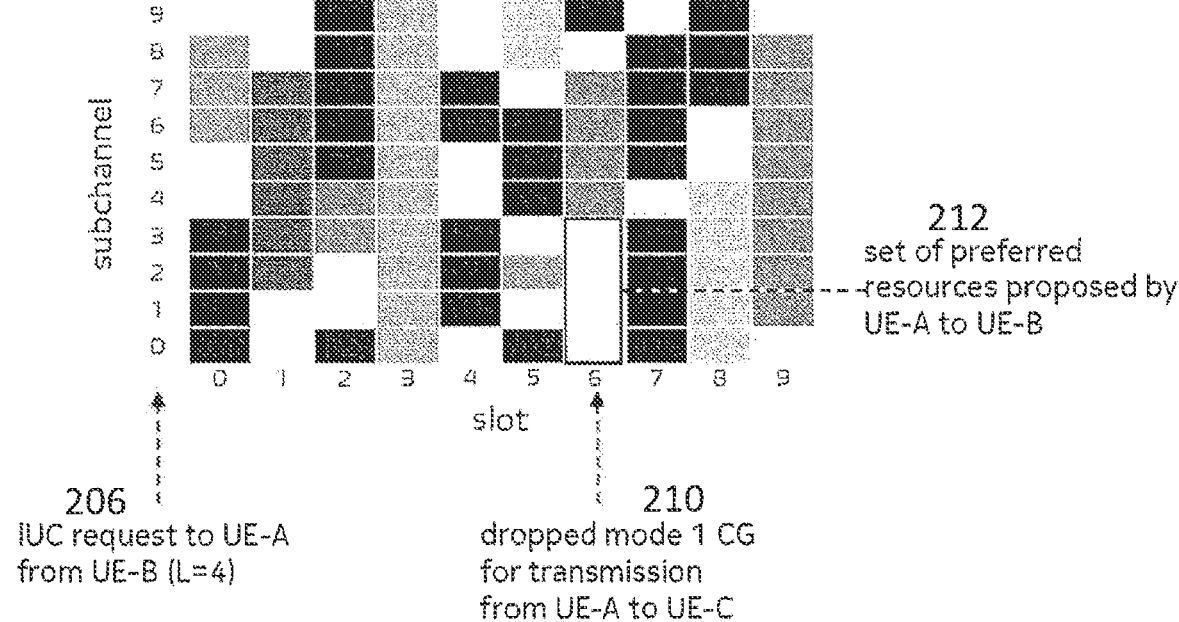
FIG. 5 illustrates a sidelink resource grid and association.

In FIG. 5, the IUC request message 206 from UE-B 110-2 (requesting UE-A 110-1 to propose L=4 subchannels) is assumed to arrive at first to UE-A 110-1. However, at the UE-A side the CBR is so high that UE-A 110-1 cannot immediately find 4 interference-free subchannels as a proposal for UE-B 110-2.

However, UE-A 110-1 needs to drop mode 1 resources 212 (from a CG 210) at slot #6 originally intended for transmission from UE-A 110-1 to UE-C 110-3. Since the dropped CG 210 is composed of 4 subchannels UE-A 110-1 transfers the complete resources (i.e. all 4 subchannels) into "resources available/free for use in mode 2 for UE-B" 214 and signals the resources associated with the CG 210 as a set of preferred (mode 2) sidelink resources 214 in an IUC response message 208 to UE-B 110-2. Thus, the IUC response message 208 may carry an indication that the proposed set of preferred resources are associated (at least partially) to dropped mode 1 resources.

Figure 6:
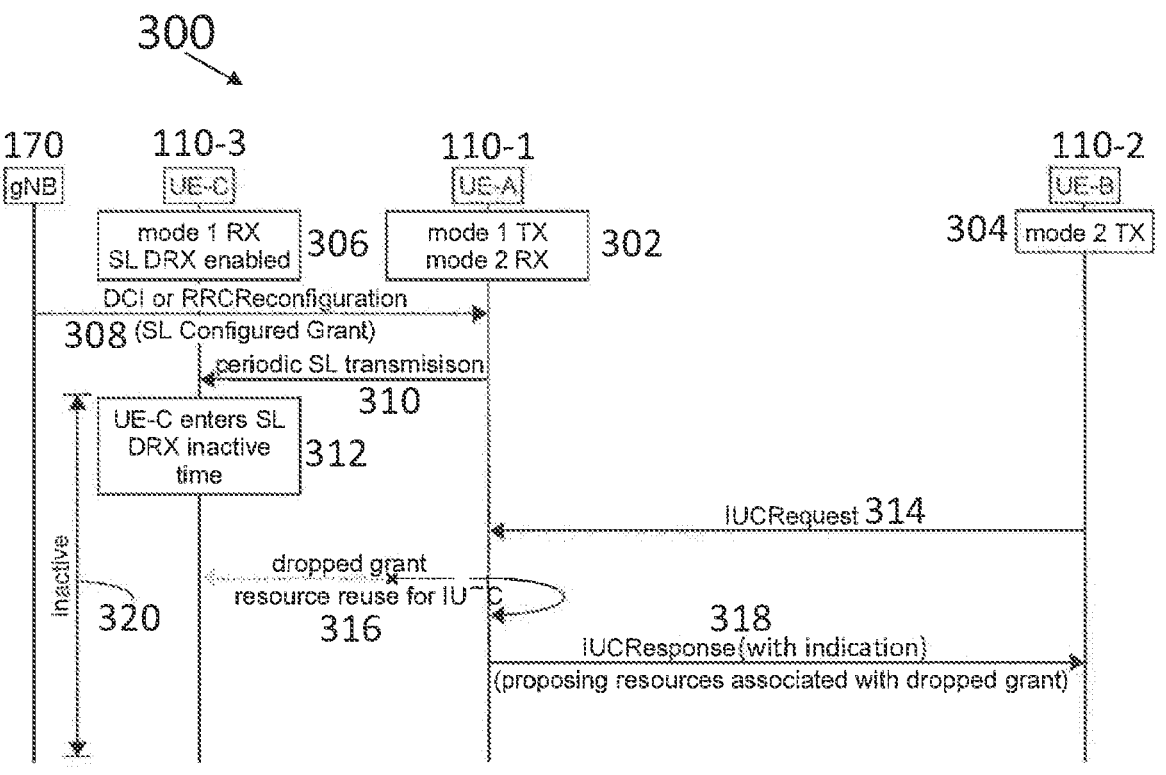
FIG. 6 is a signaling flowchart for reuse of sidelink resources associated with a dropped configured grant, based on the examples described herein.

FIG. 6 is a signaling flowchart 300, based on the examples described herein. At 302, UE-A 110-1 is configured for mode 1 TX and mode 2 RX. At 304, UE-B 110-2 is configured for mode 2 TX. At 306, UE-C 110-3 is configured for mode 1 RX and has SL DRX enabled.

At 308, gNB 170 provides a SL configured grant to UE-A 110-1, using DCI or RRC reconfiguration. At 310, UE-A 110-1 performs periodic SL transmission to UE-C 110-3. At 312, UE-C 110-3 enters SL DRX inactive time. At 314, UE-B 110-2 transmits an IUC request to UE-A 110-1. At 316, rather than use the grant provided at 308 for transmission to UE-C 110-3, UE-A 110-1 decides to drops the grant, and reuse the resources associated with the dropped grant for the IUC request transmitted at 314. At 318, UE-A 110-1 transmits an IUC response with an indication to UE-B 110-2, proposing resources associated with the dropped grant. As shown, UE-C 110-3 is in inactive time for a duration given by 320.

Figure 7:
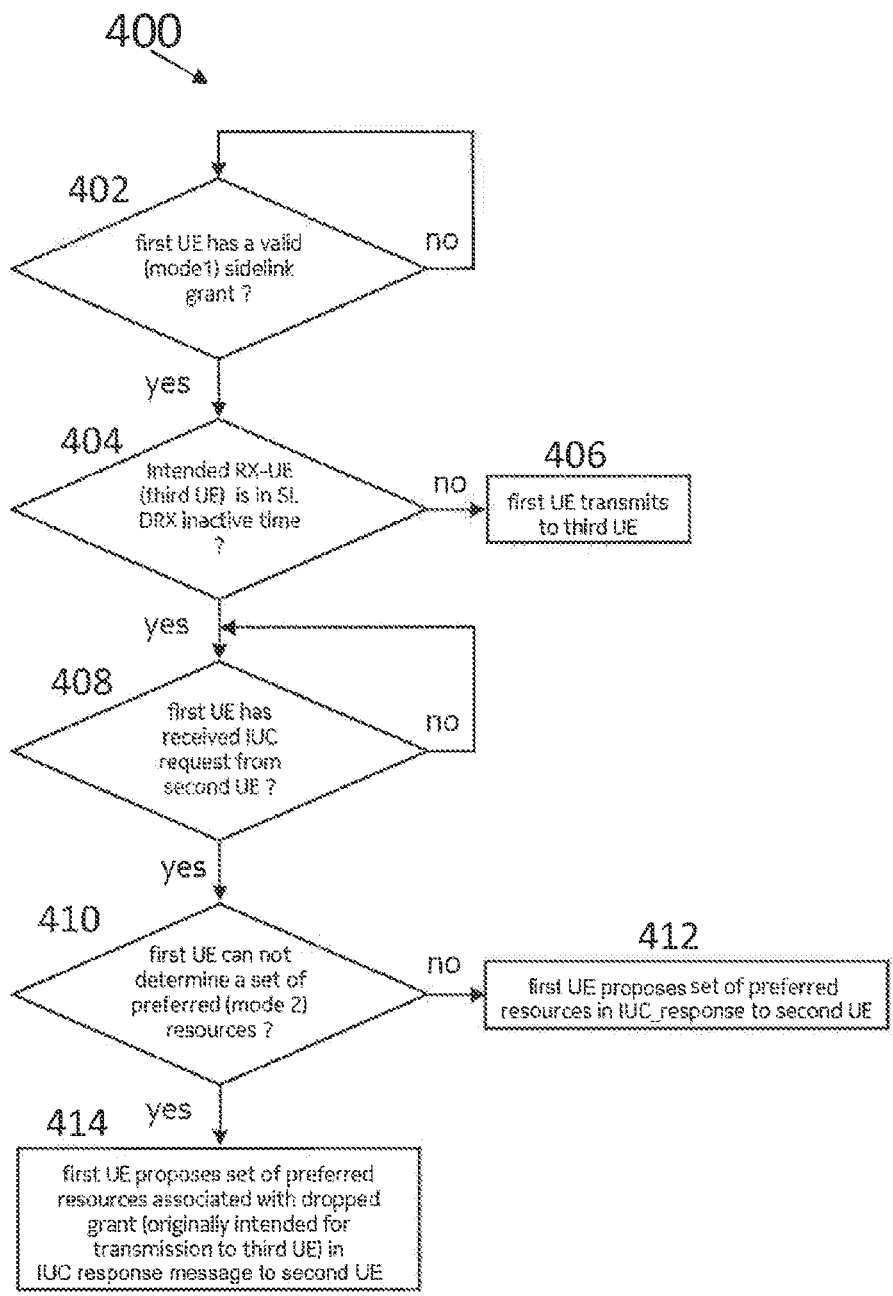
FIG. 7 is a flowchart of a method showing the behavior of a first UE (UE-A).

FIG. 7 is flowchart of a method 400 showing the behavior of a first UE (UE-A 110-1). At 402, the UE determines whether it has a valid (mode 1) sidelink grant. If the UE does not have a valid (mode 1) sidelink grant (e.g. "no"), the method transitions to 402. If the UE does have a valid (mode 1) sidelink grant, the method transitions to 404. At 404, the UE determines whether the intended RX-UE (third UE) is in SL DRX inactive time. If the UE determines that the RX-UE (third UE) is not in DRX inactive time (e.g. "no") the method transitions to 406. If the UE determines that the RX-UE (third UE) is in SL DRX inactive time, the method transitions to 408.

At 406, the first UE transmits to the third UE. At 408, the first UE determines whether the first UE has received an IUC request from a second UE. If at 408 the first UE determines that the first UE has not received an IUC request from the second UE (e.g. "no"), the method transitions back to 408. If at 408 the first UE determines that the first UE has received an IUC request from the second UE (e.g. "yes"), the method transitions to 410. At 410, the first UE determines whether the first UE cannot determine a set of preferred (mode 2) resources.

If at 410 the first UE determines that the first UE can determine a set of preferred (mode 2) resources (e.g. a "no" determination at 410), the method transitions to 412. If at 410 the first UE determines that the first UE cannot determine a set of preferred (mode 2) resources (e.g. a "yes" determination at 410), the method transitions to 414. At 412, the first UE proposes the set of preferred resources in an IUC response to the second UE. At 414, the first UE proposes a set of preferred resources associated with a dropped grant (originally intended for transmission to a third UE) in an IUC response message to the second UE.

Figure 8:
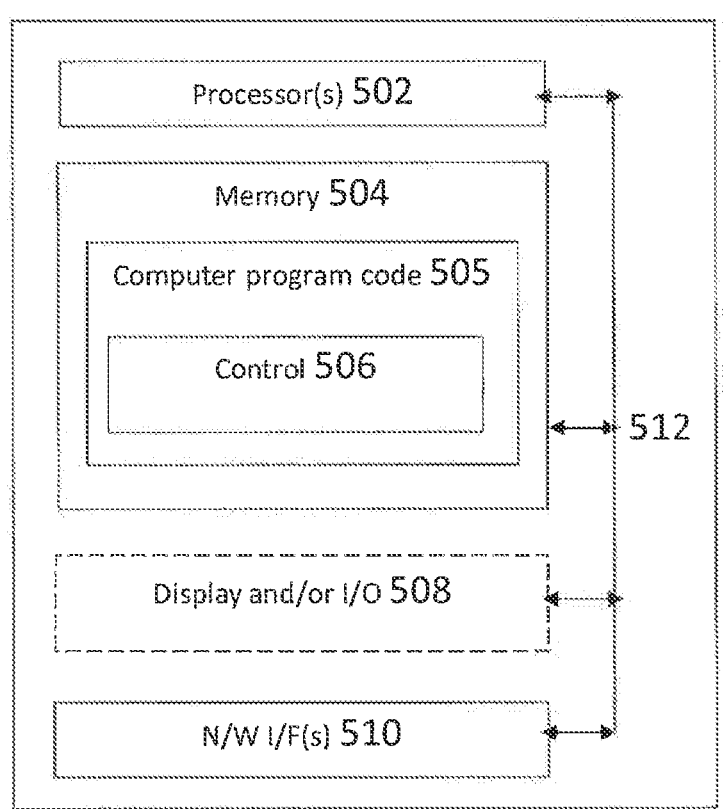
FIG. 8 is an example apparatus configured to implement the examples described herein.

FIG. 8 is an example apparatus 500, which may be implemented in hardware, configured to implement the examples described herein. The apparatus 500 comprises at least one processor 502 (e.g. an FPGA and/or CPU), at least one memory 504 including computer program code 505, wherein at least one memory 504 and the computer program code 505 are configured to, with at least one processor 502, cause the apparatus 500 to implement circuitry, a process, component, module, or function (collectively control 506) to implement the examples described herein, including reusing sidelink resources associated with a dropped grant. The memory 504 may be a non-transitory memory, a transitory memory, a volatile memory (e.g. RAM), or a non-volatile memory (e.g. ROM).

The apparatus 500 optionally includes a display and/or I/O interface 508 that may be used to display aspects or a status of the methods described herein (e.g., as one of the methods is being performed or at a subsequent time), or to receive input from a user such as with using a keypad, touchscreen, microphone, etc. The apparatus 500 includes one or more network (N/W) interfaces (I/F(s)) 510. The N/W I/F(s) 510 may be wired and/or wireless and communicate over the Internet/other network(s) via any communication technique. The N/W I/F(s) 510 may comprise one or more transmitters and one or more receivers. The N/W I/F(s) 510 may comprise standard well-known components such as an amplifier, filter, frequency-converter, (de)modulator, and encoder/decoder circuitries and one or more antennas.

The apparatus 500 to implement the functionality of control 506 may be UE 110 (including UE-A 110-1, UE-B 110-2, or UE-C 110-3), RAN node 170 (e.g. gNB), or network element (s) 190. Thus, processor 502 may correspond respectively to processor(s) 120, processor(s) 183, processor(s) 184, processor(s) 152 and/or processor(s) 175, memory 504 may correspond respectively to memory(ies) 125, memory(ies) 187, memory(ies) 186, memory(ies) 155 and/or memory(ies) 171, computer program code 505 may correspond respectively to computer program code 123, module 140-1, module 140-2, computer program code 189, module 191, computer program code 188, module 192, and/or computer program code 153, module 150-1, module 150-2, and/or computer program code 173, and N/W I/F(s) 510 may correspond respectively to transceiver 130, antenna(s) 128, transceiver and/or antenna(s) 179, transceiver and/or antenna(s) 182, N/W I/F(s) 161, and/or N/W I/F(s) 180. Alternatively, apparatus 500 may not correspond to either of UE 110, RAN node 170, or network element(s) 190, as apparatus 500 may be part of a self-organizing/optimizing network (SON) node, such as in a cloud.

The apparatus 500 may also be distributed throughout the network (e.g. 100) including within and between apparatus 500 and any network element (such as a network control element (NCE) 190 and/or the PAN node 170 and/or the UE 110).

Interface 512 enables data communication between the various items of apparatus 500, as shown in FIG. 8. For example, the interface 512 may be one or more buses such as address, data, or control buses, and may include any interconnection mechanism, such as a series of lines on a motherboard or integrated circuit, fiber optics or other optical communication equipment, and the like. Computer program code 505, including control 506 may comprise object-oriented software configured to pass data/messages between objects within computer program code 505. The apparatus 500 need not comprise each of the features mentioned, or may comprise other features as well.

FIG. 9 is an example method 600 to implement the example embodiments described herein. At 610, the method includes receiving, with a first device, a sidelink grant from a network node for transmission to a third device. At 620, the method includes receiving a coordination request from a second device. At 630, the method includes determining whether to transmit to the third device using at least one resource associated with the sidelink grant. At 630, the method includes determining whether to forward the at least one resource associated with the sidelink grant to the second device with a response to the coordination request. Method 600 may be performed with UE-A 110-1.

FIG. 10 is an example method 700 to implement the example embodiments described herein. At 710, the method includes transmitting, with a second device, a coordination request to a first device. At 720, the method includes receiving a response to the coordination request from the first device, the response comprising at least one resource associated with a dropped sidelink grant. At 730, the method includes determining whether to use, at least partially with the second device, the at least one resource associated with the dropped sidelink grant for sidelink transmission. Method 700 may be performed by UE-B 110-2.

Figure 11:
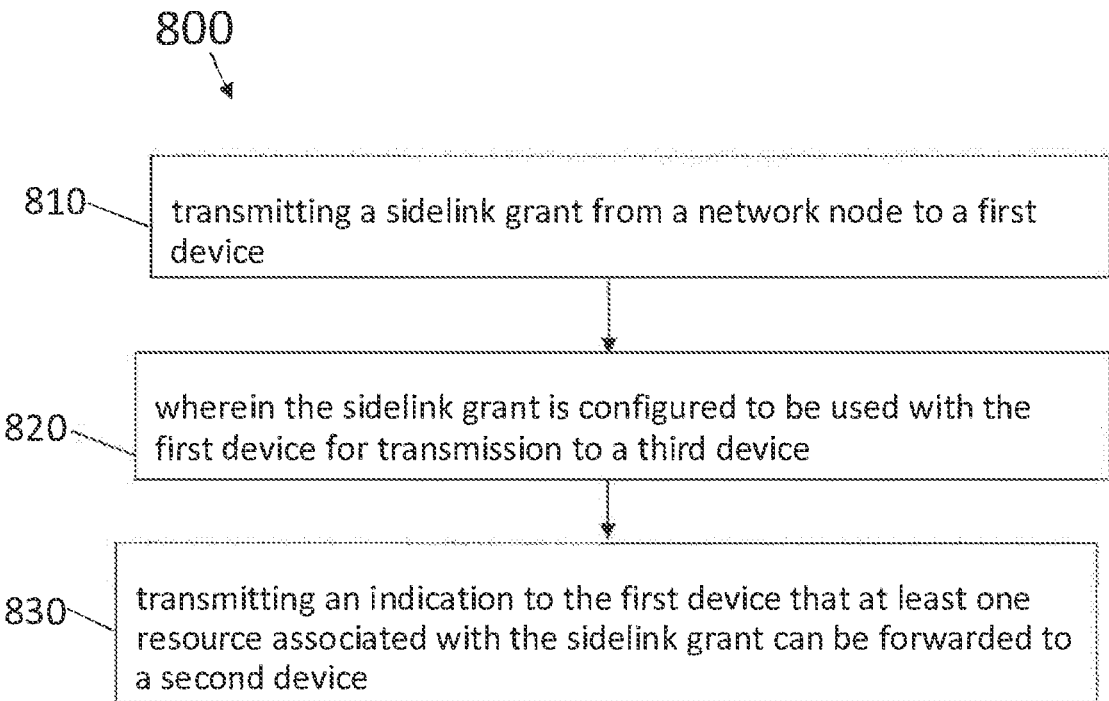
FIG. 11 is an example method performed with a network node to implement the examples described herein.

FIG. 11 is an example method 800 to implement the example embodiments described herein. At 810, the method includes transmitting a sidelink grant from a network node to a first device. At 820, the method includes wherein the sidelink grant is configured to be used with the first device for transmission to a third device. At 830, the method includes transmitting an indication to the first device that at least one resource associated with the sidelink grant can be forwarded to a second device. Method 800 may be performed with network node 170.

FIG. 12 is an example method 900 to implement the example embodiments described herein. At 910, the method includes receiving, with a third device, periodic sidelink transmission from a first device that has received a sidelink grant from a network node for the periodic sidelink transmission. At 920, the method includes entering sidelink discontinuous reception inactive time. At 930, the method includes wherein the third device fails to receive a subsequent transmission from the first device after the third device enters the sidelink discontinuous reception inactive time, or after the first device having determined to forward at least one resource associated with the sidelink grant to a second device. Method 900 may be performed with UE-C 110-3.

FIG. 13 is an example method 1000 to implement the example embodiments described herein. At 1010, the method includes determining whether a first device has a valid sidelink grant. At 1020, the method includes determining whether a third device is in sidelink discontinuous reception inactive time. At 1030, the method includes wherein the first device initially intends to transmit to the third device using the valid sidelink grant. At 1040, the method includes determining whether the first device has received a coordination request from a second device. At 1050, the method includes determining whether the first device can determine at least one preferred resource for the second device. At 1060, the method includes transmitting, in response to determining that the third device is in sidelink discontinuous reception inactive time, a response to the coordination request to the second device, the response comprising the determined at least one preferred resource, or at least one resource associated with the valid sidelink grant. Method 1000 may be performed with UE-A 110-1.

The following examples (1-56) are provided and described herein.

Example 1: An apparatus includes at least one processor; and at least one memory including computer program code; wherein the at least one memory and the computer program code are configured to, with the at least one processor, cause the apparatus at least to: receive, with a first device, a sidelink grant from a network node for transmission to a third device; receive a coordination request from a second device; determine whether to transmit to the third device using at least one resource associated with the sidelink grant; and determine whether to forward the at least one resource associated with the sidelink grant to the second device with a response to the coordination request.

Example 2: The apparatus of example 1, wherein the at least one memory and the computer program code are further configured to, with the at least one processor, cause the apparatus at least to: forward the at least one resource associated with the sidelink grant to the second device, in response to determining not to transmit to the third device.

Example 3: The apparatus of any of examples 1 to 2, wherein the at least one memory and the computer program code are further configured to, with the at least one processor, cause the apparatus at least to: forward the at least one resource associated with the sidelink grant to the second device, in response to at least one of: determining that the third device is in inactive time; the first device having another transmission with a priority higher than the transmission to the third device; the third device operating in an unlicensed band, and a failure of a listen before talk for transmission to the third device; or determining that the first device is not able to match at least one sidelink resource requirement provided with the coordination request from the second device.

Example 4: The apparatus of any of examples 1 to 3, wherein the at least one memory and the computer program code are further configured to, with the at least one processor, cause the apparatus at least to: receive an indication from the network node that the at least one resource associated with the sidelink grant can be forwarded to the second device.

Example 5: The apparatus of example 4, wherein the at least one memory and the computer program code are further configured to, with the at least one processor, cause the apparatus at least to: determine to forward the at least one resource associated with the sidelink grant to the second device, in response to receiving the indication from the network node that the at least one resource associated with the sidelink grant can be forwarded to the second device.

Example 6: The apparatus of any of examples 4 to 5, wherein the at least one memory and the computer program code are further configured to, with the at least one processor, cause the apparatus at least to: receive, with the indication, at least one condition for forwarding the at least one resource associated with the sidelink grant; wherein the at least one condition comprises at least one of: a range of reference signal received power of an air interface between the first device and the network node; a range of sidelink reference signal received power between the first device and the second device; a channel busy ratio range of a sidelink resource pool; or a quality of service of sidelink traffic of the first device and/or the second device.

Example 7: The apparatus of example 6, wherein the at least one memory and the computer program code are further configured to, with the at least one processor, cause the apparatus at least to: determine to forward the at least one resource associated with the sidelink grant to the second device, in response to receiving the indication from the network node that the at least one resource associated with the sidelink grant can be forwarded to the second device.

Example 8: The apparatus of any of examples 4 to 7, wherein the indication from the network node is received with a broadcast system information block, or is dedicated to the first device and received with dedicated radio resource control signaling.

Example 9: The apparatus of any of examples 1 to 8, wherein the at least one memory and the computer program code are further configured to, with the at least one processor, cause the apparatus at least to: drop the sidelink grant prior to forwarding the at least one resource associated with the sidelink grant to the second device.

Example 10: The apparatus of any of examples 1 to 9, wherein the at least one memory and the computer program code are further configured to, with the at least one processor, cause the apparatus at least to: report, to the network node, a dropping of the sidelink grant and/or a forwarding of the at least one resource associated with the sidelink grant to the second device.

Example 11: The apparatus of example 10, wherein the reporting comprises information of the second device, the information comprising at least one of: an identifier of the second device; a sidelink reference signal received power between the first device and the second device; or a location of the second device.

Example 12: The apparatus of any of examples 10 to 11, wherein the reporting is configured to trigger the network node to reschedule at least one sidelink resource to a set of relevant devices, the set comprising the apparatus or at least one other sidelink device in proximity of the second device.

Example 13: The apparatus of any of examples 1 to 12, wherein the at least one memory and the computer program code are further configured to, with the at least one processor, cause the apparatus at least to: receive, from the network node, a request to abandon forwarding of the at least one resource associated with the sidelink grant to the second device.

Example 14: The apparatus of any of examples 1 to 13, wherein the response to the coordination request comprising a forwarded at least one resource associated with the sidelink grant indicates that the forwarded at least one resource originated from a dropping of the sidelink grant.

Example 15: The apparatus of any of examples 1 to 14, wherein the response to the coordination request comprising a forwarded at least one resource associated with the sidelink grant indicates that the forwarded at least one resource is part of a set of at least one preferred sidelink resource for the second device.

Example 16: The apparatus of any of examples 1 to 15, wherein the at least one resource associated with the sidelink grant is configured to be used, at least partially, with the second device for sidelink transmission without revalidation.

Example 17: The apparatus of any of examples 1 to 16, wherein the response to the coordination request comprising the at least one resource associated with the sidelink grant that is forwarded to the second device is provided in response to not being able to determine a set of at least one preferred sidelink resource.

Example 18: An apparatus includes at least one processor; and at least one memory including computer program code; wherein the at least one memory and the computer program code are configured to, with the at least one processor, cause the apparatus at least to: transmit, with a second device, a coordination request to a first device; and receive a response to the coordination request from the first device, the response comprising at least one resource associated with a dropped sidelink grant; and determine whether to use, at least partially with the second device, the at least one resource associated with the dropped sidelink grant for sidelink transmission.

Example 19: The apparatus of example 18, wherein the at least one resource associated with the dropped sidelink grant is used for the sidelink transmission without revalidation.

Example 20: The apparatus of any of examples 18 to 19, wherein the at least one memory and the computer program code are further configured to, with the at least one processor, cause the apparatus at least to: transmit, with the coordination request, at least one sidelink resource requirement; wherein the response comprising the at least one resource associated with the dropped sidelink grant is received in response to the first device not being able to match the at least one sidelink resource requirement with a set of at least one preferred sidelink resource.

Example 21: The apparatus of any of examples 18 to 20, wherein the response comprising the at least one resource associated with the dropped sidelink grant is received in response to at least one of: a sidelink reference signal received power between the second device and the first device being above or below a threshold; a channel busy ratio of a sidelink resource pool being above or below a threshold; or a quality of service of sidelink traffic of the second device and/or the first device being above or below a threshold.

Example 22: The apparatus of any of examples 18 to 21, wherein the response comprising the at least one resource associated with the dropped sidelink grant indicates that the at least one resource is part of a set of at least one preferred sidelink resource for the second device.

Example 23: The apparatus of any of examples 18 to 22, wherein the response comprising the at least one resource associated with the dropped sidelink grant is provided in response to the first device not being able to determine a set of at least one preferred resource.

Example 24: An apparatus includes at least one processor; and at least one memory including computer program code;

wherein the at least one memory and the computer program code are configured to, with the at least one processor, cause the apparatus at least to: transmit a sidelink grant from a network node to a first device; wherein the sidelink grant is configured to be used with the first device for transmission to a third device; and transmit an indication to the first device that at least one resource associated with the sidelink grant can be forwarded to a second device.

Example 25: The apparatus of example 24, wherein the at least one memory and the computer program code are further configured to, with the at least one processor, cause the apparatus at least to: transmit, with the indication, at least one condition that specifies when the first device can forward the at least one resource associated with the sidelink grant to the second device; wherein the at least one condition comprises at least one of: a range of reference signal received power of an air interface between the network node and the first device; a range of sidelink reference signal received power between the first device and the second device; a channel busy ratio range of a sidelink resource pool; or a quality of service of sidelink traffic of the first device and/or the second device.

Example 26: The apparatus of any of examples 24 to 25, wherein the indication is transmitted to the first device with a broadcast system information block, or the indication is dedicated to the first device and transmitted with dedicated radio resource control signaling to the first device.

Example 27: The apparatus of any of examples 24 to 26, wherein the at least one resource associated with the sidelink grant is forwarded to the second device in response to the sidelink grant being dropped with the first device.

Example 28: The apparatus of any of examples 24 to 27, wherein the at least one memory and the computer program code are further configured to, with the at least one processor, cause the apparatus at least to: receive, from the first device, a report indicating that the first device dropped the sidelink grant and/or determined to forward the at least one resource associated with the sidelink grant to the second device.

Example 29: The apparatus of example 28, wherein the report comprises information of the second device, the information comprising at least one of: an identifier of the second device; a sidelink reference signal received power between the first device and the second device; or a location of the second device.

Example 30: The apparatus of any of examples 28 to 29, wherein the at least one memory and the computer program code are further configured to, with the at least one processor, cause the apparatus at least to: reschedule sidelink resources to a set of relevant devices, the set comprising the first device or at least one other sidelink device in proximity of the second device, based on information received within the report.

Example 31: The apparatus of any of examples 24 to 30, wherein the at least one memory and the computer program code are further configured to, with the at least one processor, cause the apparatus at least to: transmit, to the first device, a request to abandon forwarding of the at least one resource associated with the sidelink grant to the second device.

Example 32: The apparatus of any of examples 24 to 31, wherein the at least one resource associated with the sidelink grant is configured to be used, at least partially, with the second device for sidelink transmission without revalidation.

Example 33: An apparatus includes at least one processor; and at least one memory including computer program code;

wherein the at least one memory and the computer program code are configured to, with the at least one processor, cause the apparatus at least to: receive, with a third device, periodic sidelink transmission from a first device that has received a sidelink grant from a network node for the periodic sidelink transmission; and enter sidelink discontinuous reception inactive time; wherein the third device fails to receive a subsequent transmission from the first device after the third device enters the sidelink discontinuous reception inactive time, or after the first device having determined to forward at least one resource associated with the sidelink grant to a second device.

Example 34: The apparatus of example 33, wherein the third device fails to receive the subsequent transmission from the device, in response to the device having determined to drop the sidelink grant.

Example 35: An apparatus includes at least one processor; and at least one memory including computer program code; wherein the at least one memory and the computer program code are configured to, with the at least one processor, cause the apparatus at least to: determine whether a first device has a valid sidelink grant; determine whether a third device is in sidelink discontinuous reception inactive time; wherein the first device initially intends to transmit to the third device using the valid sidelink grant; determine whether the first device has received a coordination request from a second device; determine whether the first device can determine at least one preferred resource for the second device; transmit, in response to determining that the third device is in sidelink discontinuous reception inactive time, a response to the coordination request to the second device, the response comprising the determined at least one preferred resource, or at least one resource associated with the valid sidelink grant.

Example 36: The apparatus of example 35, wherein the at least one memory and the computer program code are further configured to, with the at least one processor, cause the apparatus at least to: transmit to the third device, in response to determining that the first device has a valid sidelink grant, and in response to determining that the third device is not in sidelink discontinuous reception inactive time.

Example 37: The apparatus of any of examples 35 to 36, wherein the response to the second device comprises the at least one preferred resource, in response to determining that the first device can determine the at least one preferred resource for the second device.

Example 38: The apparatus of any of examples 35 to 37, wherein the response to the second device comprises at least one resource associated with the valid sidelink grant, in response to determining that the first device cannot determine the at least one preferred resource for the second device.

Example 39: The apparatus of any of examples 35 to 38, wherein the at least one memory and the computer program code are further configured to, with the at least one processor, cause the apparatus at least to: receive the valid sidelink grant from a network node.

Example 40: The apparatus of example 39, wherein the valid sidelink grant is received from the network node with a broadcast system information block or with dedicated radio resource control signaling.

Example 41: The apparatus of any of examples 35 to 40, wherein the at least one memory and the computer program code are configured to, with the at least one processor, cause the apparatus at least to: determine not to transmit to the third device, in response to determining that the third device is in sidelink discontinuous reception inactive time.

Example 42: A method includes receiving, with a first device, a sidelink grant from a network node for transmission to a third device; receiving a coordination request from a second device; determining whether to transmit to the third device using at least one resource associated with the sidelink grant; and determining whether to forward the at least one resource associated with the sidelink grant to the second device with a response to the coordination request.

Example 43: A method includes transmitting, with a second device, a coordination request to a first device; and receiving a response to the coordination request from the first device, the response comprising at least one resource associated with a dropped sidelink grant; and determining whether to use, at least partially with the second device, the at least one resource associated with the dropped sidelink grant for sidelink transmission.

Example 44. A method includes transmitting a sidelink grant from a network node to a first device; wherein the sidelink grant is configured to be used with the first device for transmission to a third device; and transmitting an indication to the first device that at least one resource associated with the sidelink grant can be forwarded to a second device.

Example 45. A method includes receiving, with a third device, periodic sidelink transmission from a first device that has received a sidelink grant from a network node for the periodic sidelink transmission; and entering sidelink discontinuous reception inactive time; wherein the third device fails to receive a subsequent transmission from the first device after the third device enters the sidelink discontinuous reception inactive time, or after the first device having determined to forward at least one resource associated with the sidelink grant to a second device.

Example 46. A method includes determining whether a first device has a valid sidelink grant; determining whether a third device is in sidelink discontinuous reception inactive time; wherein the first device initially intends to transmit to the third device using the valid sidelink grant; determining whether the first device has received a coordination request from a second device; determining whether the first device can determine at least one preferred resource for the second device; transmitting, in response to determining that the third device is in sidelink discontinuous reception inactive time, a response to the coordination request to the second device, the response comprising the determined at least one preferred resource, or at least one resource associated with the valid sidelink grant.

Example 47: An apparatus includes means for receiving, with a first device, a sidelink grant from a network node for transmission to a third device; means for receiving a coordination request from a second device; means for determining whether to transmit to the third device using at least one resource associated with the sidelink grant; and means for determining whether to forward the at least one resource associated with the sidelink grant to the second device with a response to the coordination request.

Example 48: An apparatus includes means for transmitting, with a second device, a coordination request to a first device; and means for receiving a response to the coordination request from the first device, the response comprising at least one resource associated with a dropped sidelink grant; and means for determining whether to use, at least partially with the second device, the at least one resource associated with the dropped sidelink grant for sidelink transmission.

Example 49: An apparatus includes means for transmitting a sidelink grant from a network node to a first device;

wherein the sidelink grant is configured to be used with the first device for transmission to a third device; and means for transmitting an indication to the first device that at least one resource associated with the sidelink grant can be forwarded to a second device.

Example 50: An apparatus includes means for receiving, with a third device, periodic sidelink transmission from a first device that has received a sidelink grant from a network node for the periodic sidelink transmission; and means for entering sidelink discontinuous reception inactive time; wherein the third device fails to receive a subsequent transmission from the first device after the third device enters the sidelink discontinuous reception inactive time, or after the first device having determined to forward at least one resource associated with the sidelink grant to a second device Example 51: An apparatus includes means for determining whether a first device has a valid sidelink grant; means for determining whether a third device is in sidelink discontinuous reception inactive time; wherein the first device initially intends to transmit to the third device using the valid sidelink grant; means for determining whether the first device has received a coordination request from a second device; means for determining whether the first device can determine at least one preferred resource for the second device; means for transmitting, in response to determining that the third device is in sidelink discontinuous reception inactive time, a response to the coordination request to the second device, the response comprising the determined at least one preferred resource, or at least one resource associated with the valid sidelink grant.

Example 52: A non-transitory program storage device readable by a machine, tangibly embodying a program of instructions executable with the machine for performing operations is described/provided, the operations including receiving, with a first device, a sidelink grant from a network node for transmission to a third device; receiving a coordination request from a second device; determining whether to transmit to the third device using at least one resource associated with the sidelink grant; and determining whether to forward the at least one resource associated with the sidelink grant to the second device with a response to the coordination request.

Example 53: A non-transitory program storage device readable by a machine, tangibly embodying a program of instructions executable with the machine for performing operations is described/provided, the operations including transmitting, with a second device, a coordination request to a first device; and receiving a response to the coordination request from the first device, the response comprising at least one resource associated with a dropped sidelink grant; and determining whether to use, at least partially with the second device, the at least one resource associated with the dropped sidelink grant for sidelink transmission.

Example 54: A non-transitory program storage device readable by a machine, tangibly embodying a program of instructions executable with the machine for performing operations is described/provided, the operations including transmitting a sidelink grant from a network node to a first device; wherein the sidelink grant is configured to be used with the first device for transmission to a third device; and transmitting an indication to the first device that at least one resource associated with the sidelink grant can be forwarded to a second device.

Example 55: A non-transitory program storage device readable by a machine, tangibly embodying a program of instructions executable with the machine for performing operations is described/provided, the operations including receiving, with a third device, periodic sidelink transmission from a first device that has received a sidelink grant from a network node for the periodic sidelink transmission; and entering sidelink discontinuous reception inactive time; wherein the third device fails to receive a subsequent transmission from the first device after the third device enters the sidelink discontinuous reception inactive time, or after the first device having determined to forward at least one resource associated with the sidelink grant to a second device.

Example 56: A non-transitory program storage device readable by a machine, tangibly embodying a program of instructions executable with the machine for performing operations is described/provided, the operations including determining whether a first device has a valid sidelink grant; determining whether a third device is in sidelink discontinuous reception inactive time; wherein the first device initially intends to transmit to the third device using the valid sidelink grant; determining whether the first device has received a coordination request from a second device; determining whether the first device can determine at least one preferred resource for the second device; transmitting, in response to determining that the third device is in sidelink discontinuous reception inactive time, a response to the coordination request to the second device, the response comprising the determined at least one preferred resource, or at least one resource associated with the valid sidelink grant.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor (s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows (the abbreviations and acronyms may be appended with each other or with other characters using e.g. a dash or hyphen):

3GPP third generation partnership project
4G fourth generation
5G fifth generation
5GC 5G core network
ACK acknowledgement
AMF access and mobility management function
ASIC application-specific integrated circuit
CBR channel busy ratio
CG configured grant
CPC computer program code
CU central unit or centralized unit
DCI downlink control information
DRX discontinuous reception
DSP digital signal processor
DU distributed unit
eNB evolved Node B (e.g., an LTE base station)
en-gNB node providing NR user plane and control plane protocol terminations towards the UE, and acting as a secondary node in EN-DC
E-UTRA evolved universal terrestrial radio access, i.e., the LTE radio access technology
F1 interface between the CU and the DU
FPGA field-programmable gate array
gNB base station for 5G/NR, i.e., a node providing NR user plane and control plane protocol terminations towards the UE, and connected via the NG interface to the 5GC
ID identifier
IE information element
I/F interface
I/O input/output
IUC inter UE coordination
LBT listen before talk
LMF location management function
LTE long term evolution (4G)
MAC medium access control
MME mobility management entity
NACK negative acknowledgement
NCE network control element
ng or NG new generation
ng-eNB new generation eNB
NG-RAN new generation radio access network
NR new radio (5G)
PC5 sidelink at the physical layer
PDA personal digital assistant
PDCP packet data convergence protocol
PHY physical layer
QoS quality of service
RA resource allocation
RAM random access memory RAN radio access network
RAN1 radio layer 1
RAN2 radio layer 2
Rel- release
RLC radio link control
ROM read-only memory
RP RAN contribution
RRC radio resource control (protocol)
RSRP reference signal received power
RU radio unit
Rx or RX receiver or reception
SGW serving gateway
SIB system information block
SL sidelink
SON self-organizing/optimizing network
TRP transmission and/or reception point
TS technical specification
Tx or TX transmitter or transmission
UE user equipment (e.g., a wireless, typically mobile device)
UL uplink
UMTS universal mobile telecommunications service
UPF user plane function
Uu interface between the UE and RAN, or UMTS air interface
WI work item
X2 network interface between PAN nodes and between RAN and the core network
Xn or XN network interface between NG-RAN nodes

What is claimed is:

1. An apparatus comprising:
at least one processor; and
at least one memory storing instructions that, when executed by the at least one processor, cause the apparatus at least to perform:
  receiving, with a first device, a sidelink grant from a network node for transmission to a third device;
  receiving an indication from the network node that the at least one resource associated with the sidelink grant can be forwarded to a second device;
  receiving a coordination request from the second device;
  determining whether to transmit to the third device using at least one resource associated with the sidelink grant; and
  determining whether to forward the at least one resource associated with the sidelink grant to the second device with a response to the coordination request.

2. The apparatus of claim 1, wherein the at least one memory further stores instructions that, when executed by the at least one processor, cause the apparatus at least to perform:
  forwarding the at least one resource associated with the sidelink grant to the second device, in response to at least one of:
  determining not to transmit to the third device;
  determining that the third device is in inactive time;
  the first device having another transmission with a priority higher than the transmission to the third device;
  the third device operating in an unlicensed band, and a failure of a listen before talk for transmission to the third device; or
  determining that the first device is not able to match at least one sidelink resource requirement provided with the coordination request from the second device.

3. The apparatus of claim 1, wherein the at least one memory further stores instructions that, when executed by the at least one processor, cause the apparatus at least to perform:

determining to forward the at least one resource associated with the sidelink grant to the second device, in response to receiving the indication from the network node that the at least one resource associated with the sidelink grant can be forwarded to the second device.

4. The apparatus of claim 1, wherein the at least one memory further stores instructions that, when executed by the at least one processor, cause the apparatus at least to perform:

receiving, with the indication, at least one condition for forwarding the at least one resource associated with the sidelink grant;

wherein the at least one condition comprises at least one of:

a range of reference signal received power of an air interface between the first device and the network node;

a range of sidelink reference signal received power between the first device and the second device;

a channel busy ratio range of a sidelink resource pool; or a quality of service of sidelink traffic of the first device and/or the second device.

5. The apparatus of claim 1, wherein the indication from the network node is received with a broadcast system information block, or is dedicated to the first device and received with dedicated radio resource control signaling.

6. The apparatus of claim 1, wherein the at least one memory further stores instructions that, when executed by the at least one processor, cause the apparatus at least to perform:

dropping the sidelink grant prior to forwarding the at least one resource associated with the sidelink grant to the second device.

7. The apparatus of claim 1, wherein the at least one memory further stores instructions that, when executed by the at least one processor, cause the apparatus at least to perform:

reporting, to the network node, at least one of a dropping of the sidelink grant or a forwarding of the at least one resource associated with the sidelink grant to the second device.

8. The apparatus of claim 7, wherein the reporting comprises information of the second device, the information comprising at least one of:

an identifier of the second device;

a sidelink reference signal received power between the first device and the second device; or a location of the second device.

9. The apparatus of claim 7, wherein the reporting is configured to trigger the network node to reschedule at least one sidelink resource to a set of relevant devices, the set comprising the apparatus or at least one other sidelink device in proximity of the second device.

10. The apparatus of claim 1, wherein the at least one memory further stores instructions that, when executed by the at least one processor, cause the apparatus at least to perform:

receiving, from the network node, a request to abandon forwarding of the at least one resource associated with the sidelink grant to the second device.

11. The apparatus of claim 1, wherein the response to the coordination request comprising a forwarded at least one resource associated with the sidelink grant indicates at least one of that the forwarded at least one resource originated from a dropping of the sidelink grant, or that the forwarded at least one resource is part of a set of at least one preferred sidelink resource for the second device.

12. The apparatus of claim 1, wherein the at least one resource associated with the sidelink grant is configured to be used, at least partially, with the second device for sidelink transmission without revalidation.

13. The apparatus of claim 1, wherein the response to the coordination request comprising the at least one resource associated with the sidelink grant that is forwarded to the second device is provided in response to not being able to determine a set of at least one preferred sidelink resource.

14. An apparatus comprising:

at least one processor; and at least one memory storing instructions that, when executed by the at least one processor, cause the apparatus at least to perform:

transmitting, with a second device, a coordination request to a first device;

transmitting, with the coordination request, at least one sidelink resource requirement;

receiving a response to the coordination request from the first device, the response comprising at least one resource associated with a dropped sidelink grant;

wherein the response comprising the at least one resource associated with the dropped sidelink grant is received in response to the first device not being able to match the at least one sidelink resource requirement with a set of at least one preferred sidelink resource; and determining whether to use, at least partially with the second device, the at least one resource associated with the dropped sidelink grant for sidelink transmission.

15. The apparatus of claim 14, wherein the at least one resource associated with the dropped sidelink grant is used for the sidelink transmission without revalidation.

16. The apparatus of claim 14, wherein the response comprising the at least one resource associated with the dropped sidelink grant is received in response to at least one of:

a sidelink reference signal received power between the second device and the first device being above or below a threshold;

a channel busy ratio of a sidelink resource pool being above or below a threshold; or a quality of service of sidelink traffic of the second device and/or the first device being above or below a threshold.

17. The apparatus of claim 14, wherein the response comprising the at least one resource associated with the dropped sidelink grant indicates that the at least one resource is part of a set of at least one preferred sidelink resource for the second device, or is provided in response to the first device not being able to determine a set of at least one preferred resource.

18. A method comprising:

receiving, with a first device, a sidelink grant from a network node for transmission to a third device;

receiving an indication from the network node that the at least one resource associated with the sidelink grant can be forwarded to a second device;

receiving a coordination request from the second device;

determining whether to transmit to the third device using at least one resource associated with the sidelink grant; and determining whether to forward the at least one resource associated with the sidelink grant to the second device with a response to the coordination request.

* * * * *